United States Patent
Heruth et al.

(10) Patent No.: US 7,403,883 B2
(45) Date of Patent: Jul. 22, 2008

(54) THREE-DIMENSIONAL IN-VITRO SPINAL MODELS AND METHODS OF ANALYZING SUBSTANCE DISTRIBUTION THEREIN

(75) Inventors: Kenneth T. Heruth, Edina, MN (US); Mark S. Lent, Brooklyn Park, MN (US); Michael Hegland, Mounds View, MN (US)

(73) Assignee: Medtronic, Inc., Minneapolis, MN (US)

( * ) Notice: Subject to any disclaimer, the term of this patent is extended or adjusted under 35 U.S.C. 154(b) by 602 days.

(21) Appl. No.: 10/957,359

(22) Filed: Oct. 1, 2004

(65) Prior Publication Data

US 2005/0106545 A1     May 19, 2005

Related U.S. Application Data

(60) Provisional application No. 60/566,866, filed on Apr. 30, 2004, provisional application No. 60/532,414, filed on Dec. 23, 2003, provisional application No. 60/508,353, filed on Oct. 3, 2003.

(51) Int. Cl.
    *G06G 7/58* (2006.01)
(52) U.S. Cl. ............... 703/11; 514/12; 514/2; 514/121; 514/574; 514/89; 424/141.1; 424/93.21; 424/146.1; 424/78.37; 600/340; 600/416; 600/419; 600/159
(58) Field of Classification Search ...... 703/4, 703/6, 11; 434/268, 274, 267; 514/44; 604/20, 604/502; 607/9, 117, 46
    See application file for complete search history.

(56) References Cited

U.S. PATENT DOCUMENTS

| | | | |
|---|---|---|---|
| 2,207,153 A | | 7/1940 | Judovich |
| 3,724,467 A | * | 4/1973 | Avery et al. ......... 607/117 |
| 4,773,865 A | * | 9/1988 | Baldwin ............... 434/268 |

(Continued)

FOREIGN PATENT DOCUMENTS

FR    2 776 805    10/1999

(Continued)

OTHER PUBLICATIONS

"Injury of the anterior longitudinal ligament during whiplash simulation", Ivancic et al, European Spine Journal, pp. 61-68, 2003.*

(Continued)

*Primary Examiner*—Kamini S Shah
*Assistant Examiner*—Cuong V Luu
(74) *Attorney, Agent, or Firm*—Mueting, Raasch & Gebhardt, P.A.

(57) ABSTRACT

An in-vitro model apparatus of a human spine and methods for detecting and analyzing substance distribution patterns therein. In one embodiment, the model apparatus includes a column body defining a passageway that substantially mimics the size, shape, and structure of an adult human spinal canal. Also included is a cord structure that may be located and anchored within the passageway. The cord structure substantially mimics the size, shape, and structure of an adult human spinal cord. For example, the cord structure may include connecting elements that resemble nerve roots, dentate ligaments, and the septum posticum of a human spine. The passageway of the model apparatus may be filled with a first fluid that simulates cerebro-spinal fluid (CSF), and a second fluid containing a drug (or simulated drug) may be introduced into the passageway, after which the drug's distribution within the passageway may be analyzed.

34 Claims, 12 Drawing Sheets

U.S. PATENT DOCUMENTS

| | | | | |
|---|---|---|---|---|
| 5,501,703 | A | * | 3/1996 | Holsheimer et al. ............ 607/46 |
| 5,643,330 | A | * | 7/1997 | Holsheimer et al. ............ 607/46 |
| 5,672,059 | A | * | 9/1997 | Browne-Wilkinson ...... 434/274 |
| 6,319,241 | B1 | * | 11/2001 | King et al. ................... 604/502 |
| 6,422,874 | B1 | * | 7/2002 | Green et al. ................ 434/274 |
| 6,795,737 | B2 | * | 9/2004 | Gielen et al. ................ 607/117 |
| 6,908,309 | B2 | * | 6/2005 | Gil et al. ...................... 434/267 |
| 7,218,964 | B2 | * | 5/2007 | Hill et al. ......................... 607/9 |
| 2001/0053885 | A1 | * | 12/2001 | Gielen et al. .................. 604/20 |
| 2003/0083299 | A1 | * | 5/2003 | Ferguson ...................... 514/44 |
| 2004/0101815 | A1 | * | 5/2004 | Jay et al. ..................... 434/274 |
| 2004/0203079 | A1 | * | 10/2004 | Pentyala ...................... 435/7.4 |

FOREIGN PATENT DOCUMENTS

| | | | |
|---|---|---|---|
| GB | 2232522 | * | 12/1990 |
| GB | 2 369 714 A | | 6/2002 |
| WO | WO 99/50808 | | 10/1999 |

OTHER PUBLICATIONS

Whole Cervical Spine Model with Muscle Force Replication for Whiplash Simulation: Development and Evaluation, Ivancic et al, Yale University, 2003.*

"Biofidelic whole cervical spine model with muscle force replication for whiplash simulation", Ivancic et al, European Spine Journal, 2004.*

U.S. Appl. No. 60/566,866, filed Apr. 30, 2004, Heruth et al.

Di Chiro et al., "Spinal descent of cerebrospinal fluid in man," Neurology, 1976;26:1-8.

Greitz et al., "On the Pulsatile Nature of Intracranial amd Spinal CSF-Circulation Demonstrated by MR Imaging," Acta Radiologica, 1993;34:321-328.

Holsheimer, et al., "MR Assessment of the Normal Position of the Spinal Cord in the Spinal Canal," Am. J. Neuroradiol., 1994;15:951-959.

Nitz et al., "Flow Dynamics of Cerebrospinal Fluid: Assessment with Phase-Contrast Velocity MR Imaging Performed with Retrospective Cardiac Gating," Radiology, 1992:183:395-405.

Thomsen et al., "Fourier Analysis of Cerebrospinal Fluid Flow Velocities: MR Imaging Study," Radiology, 1990;177:659-665.

Kekesi et al., "The Antinociceptive Potencies and Interactions of Endogenous Ligands During Continuous Intrathecal Administration: Adenosine, Agmatine, and Endomorphin-1," Anesth. Analg., 2004;98(2):420-426.

Krupp et al., "Pharmacokinetics of Intrathecal Oligodeoxynucleotides," Anesthesiology, 2004;100(2):315-322.

Rigler et al., "Distribution of Catheter-injected Local Anesthetic in a Model of the Subarachnoid Space," Anesthesiology, 1991;75:684-692.

Yaksh, Ed., Spinal Drug Delivery, Elsevier Science B.V., Amsterdam, The Netherlands, 1999; cover page, title page, introductory pages, table of contents, and pp. 1-614.

Wall et al., Textbook of Pain, Fourth Edition, Churchill Livingstone, London, 1999; title page, copyright page, and table of contents, 5 pages.

De Wachter et al., "Distribution of Marcaine® in an in vitro model of the subarachnoid space conforming to actual spinal column geometries," Technology and Health Care, 1997;5:437-447.

* cited by examiner

SECTION C5

SECTION T1

SECTION T6

SECTION T12

*Fig. 11C*

THREE-DIMENSIONAL IN-VITRO SPINAL MODELS AND METHODS OF ANALYZING SUBSTANCE DISTRIBUTION THEREIN

RELATED APPLICATIONS

This application claims the benefit of: U.S. Provisional Application No. 60/508,353, filed 3 Oct. 2003; U.S. Provisional Application No. 60/532,414, filed 23 Dec. 2003; and U.S. Provisional Application No. 60/566,866, filed 30 Apr. 2004, all of which are hereby incorporated herein by reference in their respective entireties.

TECHNICAL FIELD

The present invention relates generally to the field of spinal cord research and, more particularly, to three dimensional in-vitro human spinal models and methods of simulating and analyzing substance, e.g., drug, distribution patterns therein.

BACKGROUND

Self assessment of therapeutic results from patients with implanted drug delivery systems for pain and spasticity therapy indicate that efficacy varies from poor to excellent. While there are a number of factors that may contribute to this variation, at least some of this disparity may be due to variability in the amount of drug that actually reaches the intended pain receptors. Stated alternatively, when the delivered drugs reach the intended receptors, it is believed that more effective therapy results. When the delivered drugs are unable to reach the intended receptors, or are otherwise substantially diluted by the time they reach the intended receptors, therapeutic effects may be diminished.

Further aggravating this problem is the fact that drugs that do not reach the desired receptors may migrate to yet other receptors, potentially resulting in unintended and undesirable side effects. Such side effects may necessitate a reduction in the overall drug dosage that the patient may safely tolerate.

To treat pain and/or spasticity, therapeutic drugs are often infused, or otherwise delivered, into cerebrospinal fluid (CSF) contained within an intrathecal space surrounding the spinal cord. The drug may then distribute through the CSF, whereby at least some of the drug is intended to reach the target receptors.

While effective, distribution of drugs through CSF is complex and is not well understood. For example, drug distribution mechanisms through CSF may include: diffusion through the CSF; diffusion into the spinal cord and epidural space, then diffusion through the tissues; natural CSF convection (CSF convection may result from production and uptake processes, arterial expansion from cardiac cycle, tissue displacement during the respiratory cycle, tissue displacement during body motion, etc.); mixing of the drug in CSF due to movement around spinal structures; and buoyancy due to differences in density. These factors make it difficult to predict what infusion characteristics will yield the greatest efficacy. Compounding this problem is the fact that clinicians are often unable to effectively improve therapy for those patients who initially report poor results.

It is difficult to directly measure the amount of drug that reaches the desired receptors within the spinal cord, or even to determine an approximate drug distribution within CSF. For example, in humans, CSF samples are generally only taken below the cauda equina or in the cisterna magna to avoid damaging the spinal cord with the sampling needle. As a result, drug presence at receptors located at specific locations along the spinal cord is difficult to quantify.

Further, drugs introduced into CSF are not easily imaged via non-invasive methods. Rather, as drug concentration in CSF is low, a marker or contrast agent is generally required for accurate detection. However, markers pose a potential risk of neurotoxicity. In fact, only one marker, 111In-DTPA, is approved and labeled for use in the central nervous system (CNS) by the U.S. Food and Drug Administration. While 111In-DTPA may be detected with nuclear imaging cameras, it is also much heavier than many neurological drugs and thus may not distribute within CSF in the same manner.

Still further, while small and large animal models have been used to study drug distribution within the spine, such animals do not have a spinal anatomy that is similar to humans, primarily because these animals do not walk, stand, and sit upright. Thus, such animal studies are not believed to provide an accurate prediction of drug distribution in humans.

SUMMARY

The present invention provides an in-vitro spinal model that permits the study and analysis of how a substance may be distributed along a human spinal canal. The model may be used to characterize distribution patterns, potentially allowing more effective drug therapy.

In one embodiment, a three-dimensional in-vitro model apparatus of a human spine is provided. The model apparatus may include a model body having a column portion, where the column portion defines a curved passageway in the shape of a human spinal canal. A cord structure is also included and located within the passageway of the column portion. The cord structure is securable within the passageway such that an annular region is formed between a wall of the passageway and the cord structure. The model apparatus may optionally include one or more of the following features: a fluid occupying the annular region; a variation in cross-sectional area and cross-sectional shape of one or both of the passageway and the cord structure over their respective longitudinal lengths; at least one root element extending between the cord structure and the wall of the passageway; fin members extending between the cord structure and the wall of the passageway, the fin members operable to partition the annular region into two or more longitudinal chambers; a pump assembly operatively coupled to the passageway; an oscillatory flow apparatus operable to create an oscillating flow of the fluid through the annular region; and tube elements extending along a portion of the length of the cord structure, each tube element having a first end coupled to the cord structure.

In another embodiment, a method of characterizing a distribution of a substance in a human spinal column is provided. The method may include introducing a second fluid comprising the substance into a first fluid, where the first fluid is located within an annular region of a spinal model. The spinal model may include a model body having a column portion, where the column portion defines a curved passageway in the shape of a human spinal canal. The model may also include a cord structure located within the passageway of the column portion, wherein the cord structure is securable within the passageway such that the annular region is formed between a wall of the passageway and the cord structure. The method may also include detecting a concentration of the substance within the first fluid at one or more locations along the passageway. The method may optionally include: visually monitoring the distribution of the substance within the first fluid through a transparent portion of the column portion; and circulating the first fluid within the annular region.

The above summary is not intended to describe each embodiment or every implementation of the present invention. Rather, a more complete understanding of the invention will become apparent and appreciated by reference to the following Detailed Description of Exemplary Embodiments and claims in view of the accompanying figures of the drawing.

BRIEF DESCRIPTION OF THE VIEWS OF THE DRAWING

The present invention will be further described with reference to the drawing, wherein:

FIGS. 11A-11C illustrate exemplary substance, e.g., drug, distribution profiles for a first exemplary test configuration using the model apparatus of FIG. 7, the profiles taken at various vertebral locations within an anterior chamber of the spinal model (FIG. 11A), a left posterior chamber of the spinal model (FIG. 11B), and a right posterior chamber of the spinal model (FIG. 11C)

DETAILED DESCRIPTION OF EXEMPLARY EMBODIMENTS

Figure 1:
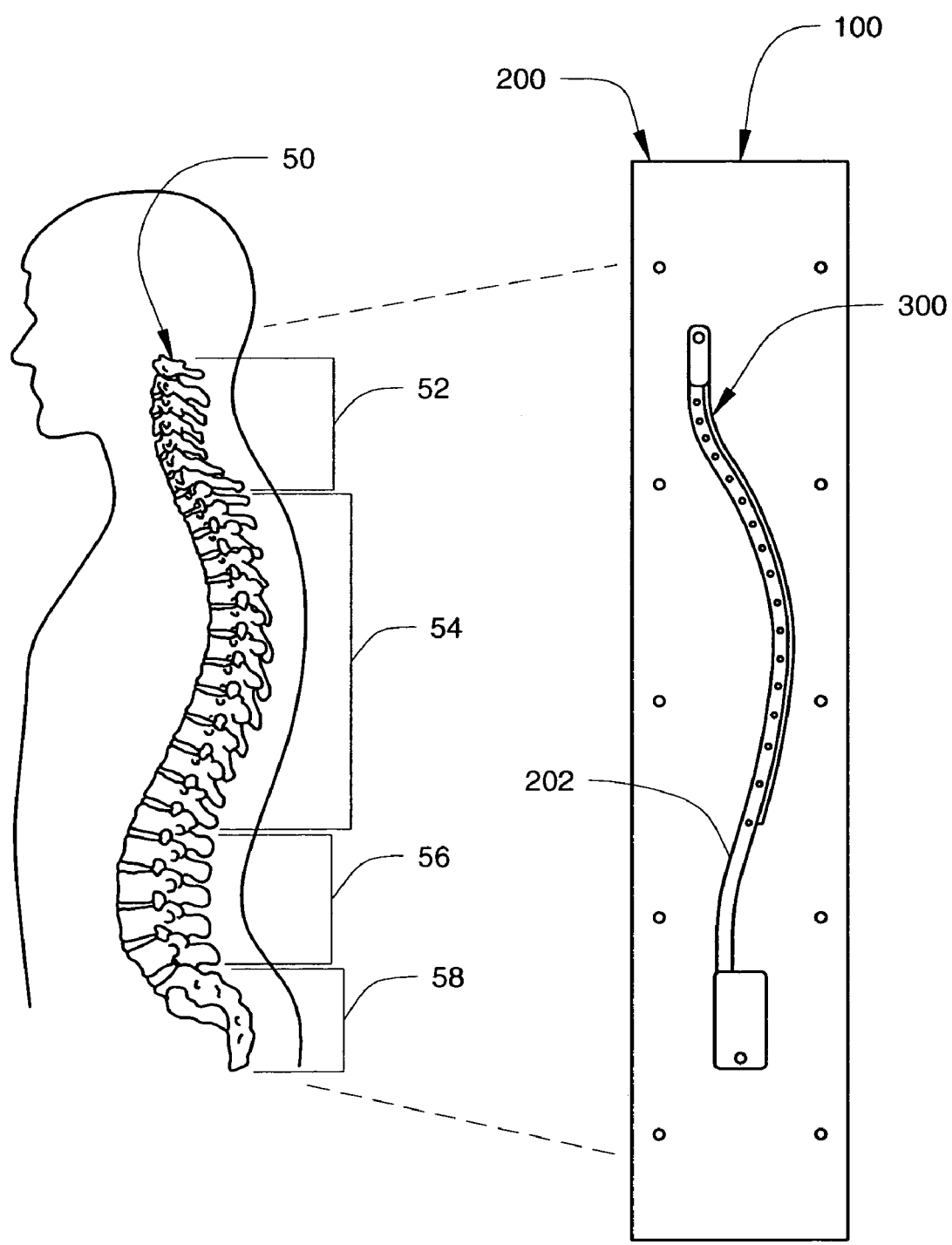
FIG. 1 illustrates a side elevation view of an in-vitro spinal model apparatus in accordance with one embodiment of the invention.

In the following detailed description of exemplary embodiments, reference is made to the accompanying figures of the drawing which form a part hereof, and in which are shown by way of illustration specific embodiments in which the invention may be practiced. It is to be understood that other embodiments may be utilized and structural changes may be made without departing from the scope of the present invention.

The present invention is generally directed to in-vitro spinal models. More specifically, the present invention is directed to spinal model apparatus and methods for visualizing and analyzing distribution of substances, e.g., drugs, delivered within a spinal column via implantable catheters or other techniques now known or later developed.

While the present invention is described herein with respect to healthy human spinal anatomy, those of skill in the art will readily appreciate that the apparatus and techniques described herein may be readily modified to accommodate most any vertebrate model.

FIG. 1 illustrates a three-dimensional in-vitro spinal model apparatus 100 (also referred to herein as "model") in accordance with one embodiment of the invention. The apparatus 100 may include a model body 200 including a column portion that surrounds and defines a substantially enclosed curved passageway 202 operable to receive therein a cord structure 300. As clearly illustrated in this view, the passageway 202 and cord structure 300 substantially mimic, in size, shape, and structure, the corresponding spinal canal and spinal cord of a spine 50 of a standing adult human. That is, the passageway 202 may curve in a generally smooth, partial S shape when viewed from the side as shown in FIG. 1.

As reference for the apparatus 100, FIG. 1 illustrates the vertebrae sections of a typical human spine 50. In general, the vertebrae are identified according to their particular location along the spinal column. For example, the uppermost vertebrae are the cervical vertebrae 52, which include seven vertebrae commonly identified as C1-C7 (in descending order in FIG. 1). Immediately below the cervical vertebrae 52 are the thoracic vertebrae 54, which include twelve vertebrae identified as T1-T12 (in descending order). Immediately below the thoracic vertebrae 54 are the lumbar vertebrae 56, which include five vertebrae identified as L1-L5 (in descending order). At the lower end of the spinal column 50 is the sacral vertebrae 58. While not illustrated in FIG. 1, the apparatus 100 may include indicia that identify one or more of these vertebral locations, e.g., T1-T12, on the model body 200.

Figure 2:
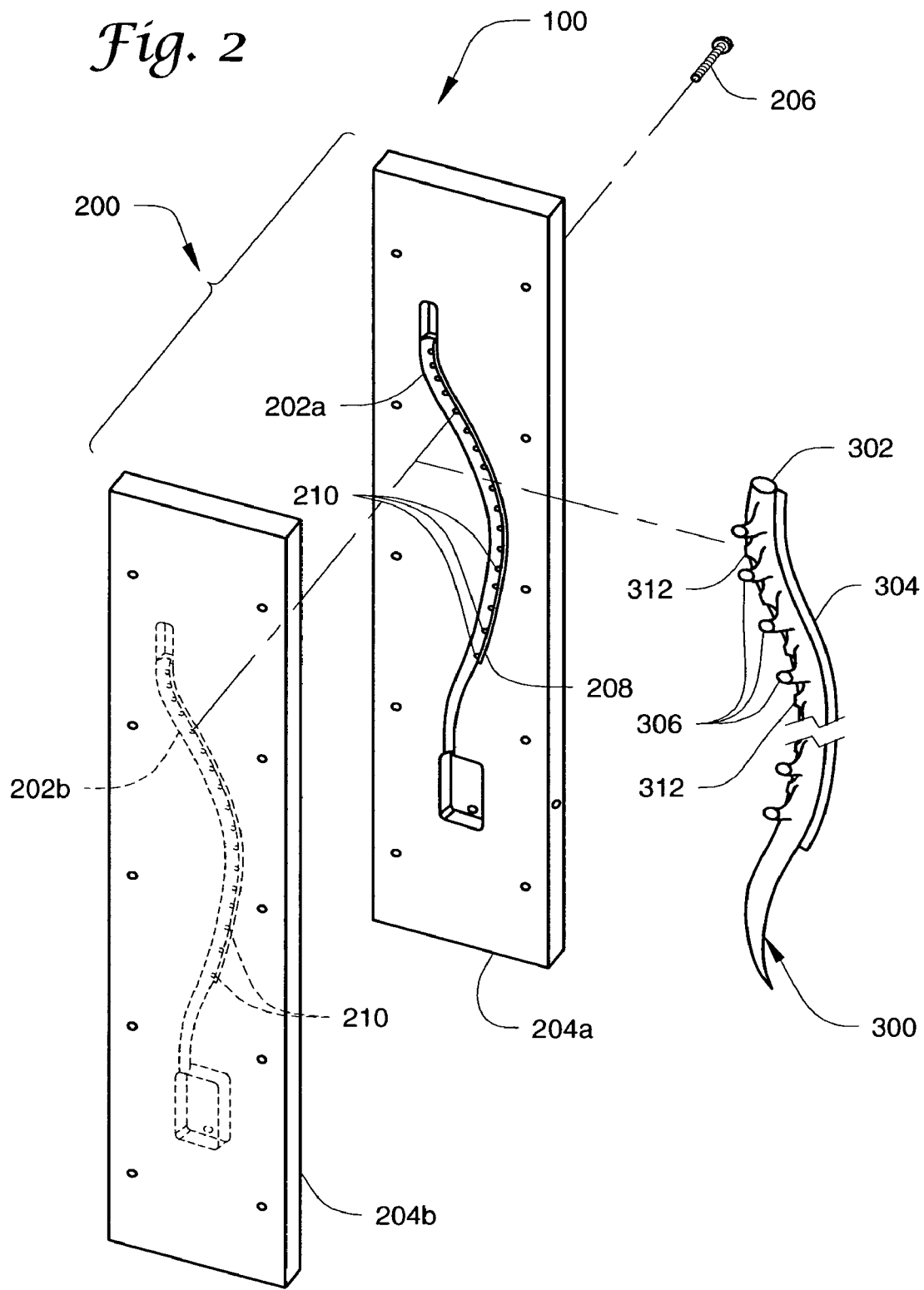
FIG. 2 is an exploded view of the spinal model apparatus of FIG. 1, wherein a cord structure is shown in conjunction with a model body defining a column portion having a passageway therein.

FIG. 2 is an exploded view of the apparatus 100. In some embodiments, the model body 200 may be formed from mating halves 204a and 204b that are substantially mirror images of one another. Each half 204a, 204b may have formed therein a channel 202a, 202b, respectively, such that when the halves are assembled, the channels 202a, 202b combine to form the passageway 202. The halves 204a and 204b may be attached to one another via most any technique. For example, fasteners 206 (only one shown in FIG. 2) may pass through the body half 204a and thread into the half 204b or, alternatively, pass through both halves, 204a, 204b and be secured with a nut.

The body halves 204a, 204b may be made from most any material. For example, in one embodiment, the halves are made from transparent acrylic plates each approximately 92 centimeters (cm) high, 20 cm wide, and 3.5 cm thick. The use of acrylic provides numerous advantages including, for example, simplified machining of the channels 202a, 202b, and generally unimpeded visibility of the entire passageway 202 and cord structure 300 during use. While not illustrated herein, the halves 204a, 204b may incorporate a sealing member, e.g., a gasket or an O-ring, that surrounds the passageway 202 so that fluids within the passageway may be contained therein.

Prior to assembling the halves 204a, 204b, the cord structure 300 may be located between the channel portions 202a, 202b. The cord structure 300 (only partially illustrated in FIG. 2) may include a longitudinal cord portion 302 to simulate the human spinal cord. It may also include other portions, e.g., connecting elements, that permit the cord structure to be anchored relative to the body halves 204a, 204b. For example, the cord structure 300 may include a dorsal fin member 304 extending along the longitudinal length of the posterior side of the cord portion 302 and spanning across the annular region. The fin member 304 may be retained or trapped between the halves 204a and 204b, e.g., in a groove 208. The dorsal fin member 304, as further described below, may generally anatomically mimic the membraneous septum posticum of the human spine. As with the septum posticum, the dorsal fin member 304 provides a wall dividing the posterior left and right sides of the passageway 202.

Also illustrated in the embodiment of the cord structure 300 of FIG. 2 are other connecting elements, e.g., transverse tabs 306 and lateral fin members 312. The tabs 306 are operable to be received within openings 210 in the model body 200, while the lateral fin members 312 may extend to and, in some embodiments, through, an inner wall of the passageway 202. As further explained below, the transverse tabs 306 and lateral fin members 312 are designed to simulate other aspects of the human spine.

To yield an anatomically accurate model of the human spine, the human spine area was digitized using information obtained from The Visible Human Project (VHP) of the National Library of Medicine, Bethesda, Md., USA. Due to resolution limitations in the cross sections obtained, many tissue boundaries were too faint to permit clear visual separation within the images. To rectify this problem, anatomy textbooks were utilized to manually resolve the expanded images based upon where tissue boundaries were most likely located. During this process, fine structures that could not be discerned, e.g., nerve roots, dentate ligament, and septum posticum, were also added to the images. These images were manually entered into a computer aided design (CAD) model, after which the cross sections were combined into a three-dimensional CAD model.

The subject of the VHP had some common irregularities in his spinal anatomy, e.g., minor scoliosis, asymmetric spinal cord and spinal canal, and a spinal cord which was off-center within the spinal canal. While these irregularities are not unusual, they are also not consistent between individuals. These irregularities may result in variations in fluids flowing through the spinal canal and, as a result, potentially affect the mixing of substances, e.g., drugs, within the canal. Thus, for simplicity, the spinal model was modified from the VHP images to be generally symmetrical. These modifications utilized published spinal cord dimensions at several vertebral locations (see *MR Assessment of the Normal Position of the Spinal Cord in the Spinal Canal*, Holsheimer et al., *AJNR* (*Am J Neuroradiology*) 15 (1994)951-959).

The model of the spine was also "straightened" in CAD to eliminate scoliosis. Moreover, the cross sections of the spinal cord and spinal canal of the model were modified to appear as generally regular ellipses based upon published data (see Holsheimer et al.) with the cord centered laterally within the canal. Dorsal-ventral positioning was not changed from the VHP model.

The CAD model of the spinal canal was split into two halves. The three-dimensional channels 202a, 202b were then milled into each half 204a, 204b, respectively. The openings 210 were also machined to receive the tabs 306 ("nerve root bundles") of the cord structure 300 as further described below. When the two halves 204a, 204b were then assembled, the combined channels 202a, 202b yielded the passageway 202, which corresponds to the intrathecal space in the spinal canal.

The CAD model was also used to create the three-dimensional model of the spinal cord structure 300 using stereolithography (SLA) techniques. Composite images of the cord structure 300 are illustrated in FIGS. 3-6, while representative cross sections are illustrated in FIGS. 8 and 10A-10D. To create the cord structure 300, some finer structures, e.g., the septum posticum (dorsal fin member 304), may be made thicker than anatomically normal. However, such modifications are not believed to adversely affect the flow characteristics of the model apparatus 100. Depending on the capabilities of the SLA machine, the cord structure 300 may be made in separate pieces, e.g., three pieces, and subsequently joined.

Figure 3:
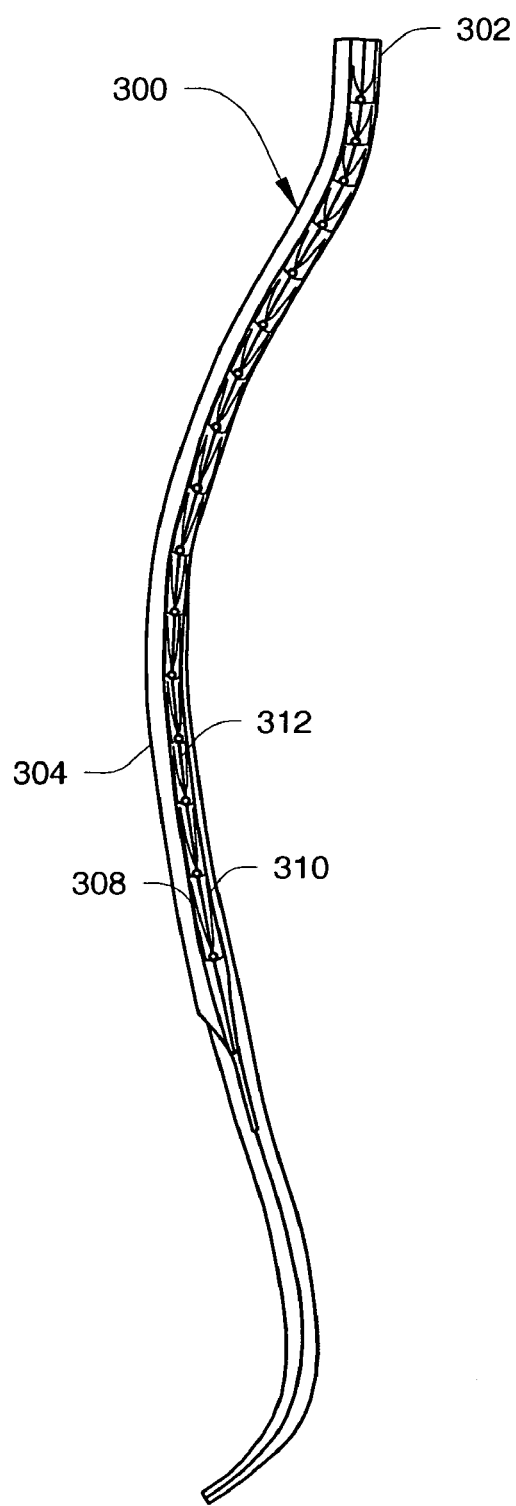
FIG. 3 is a side elevation view of the cord structure of FIG. 2.
Figure 4:
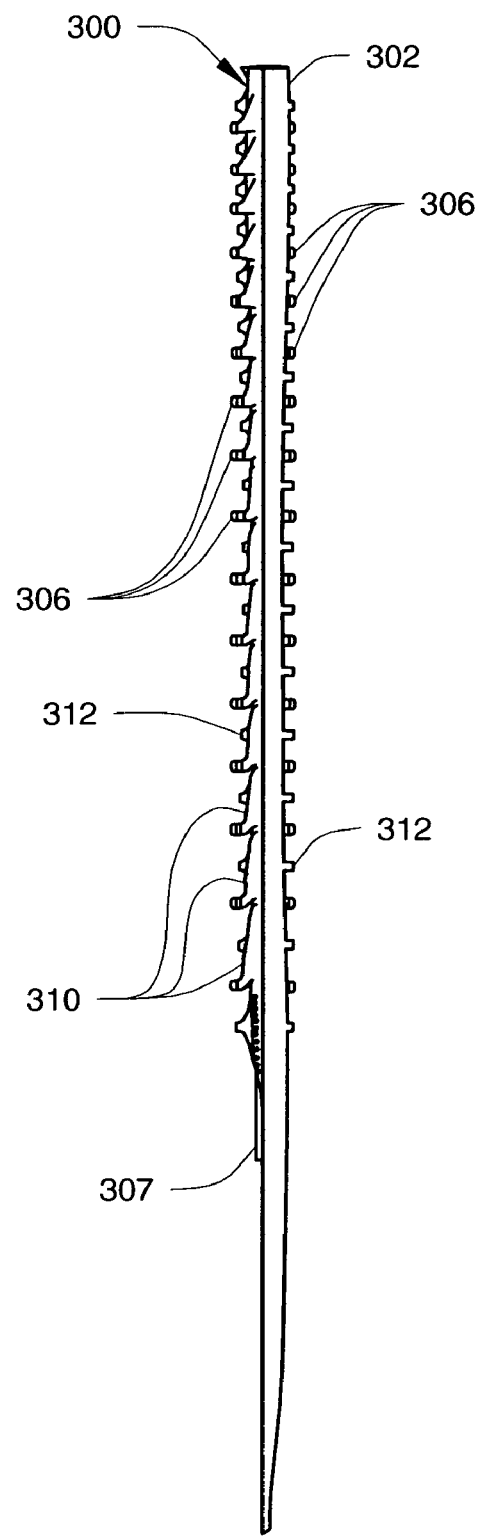
FIG. 4 is a front elevation view of the cord structure of FIG. 2.
Figure 5:
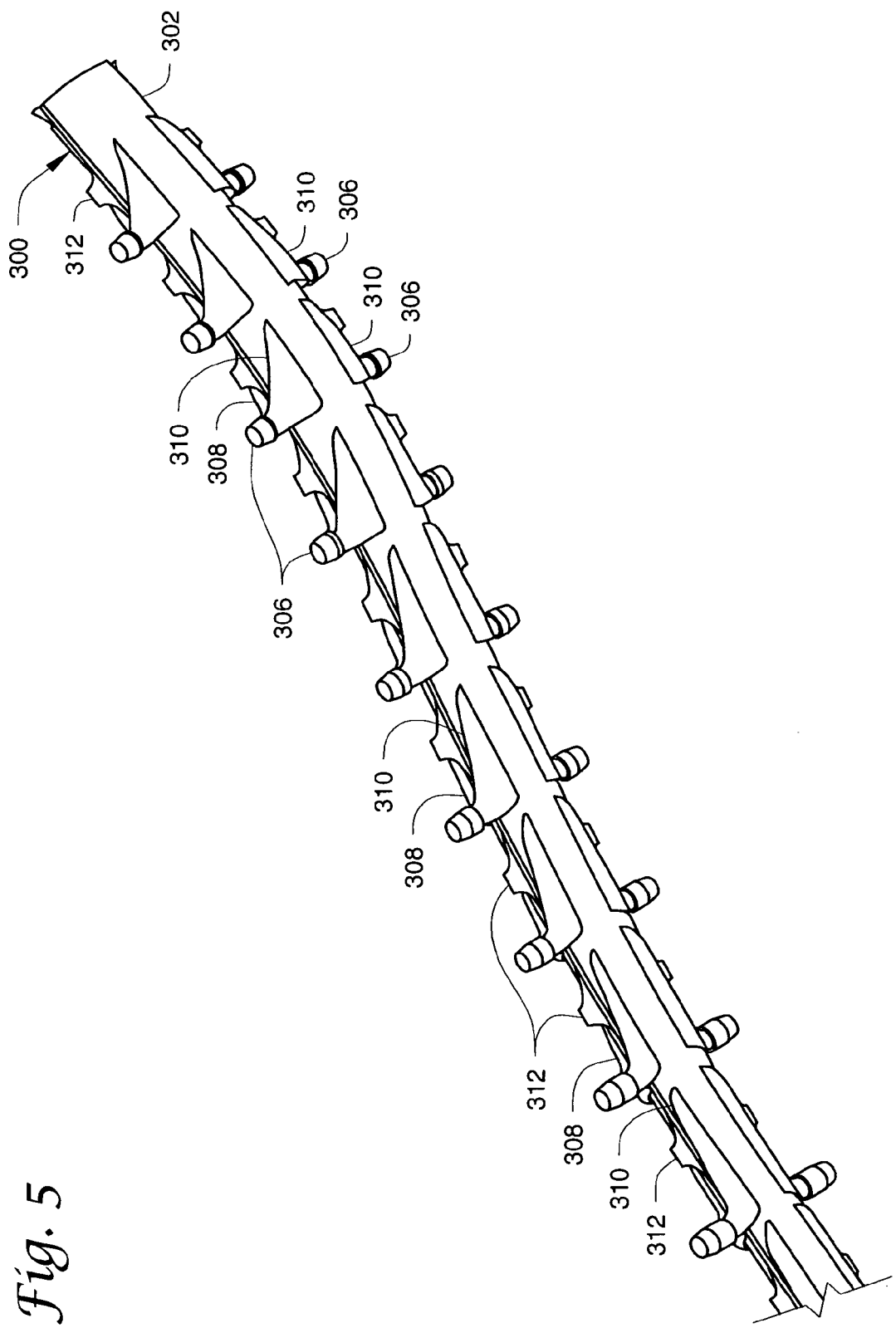
FIG. 5 is a perspective view of a portion of the cord structure of FIG. 2.
Figure 6:
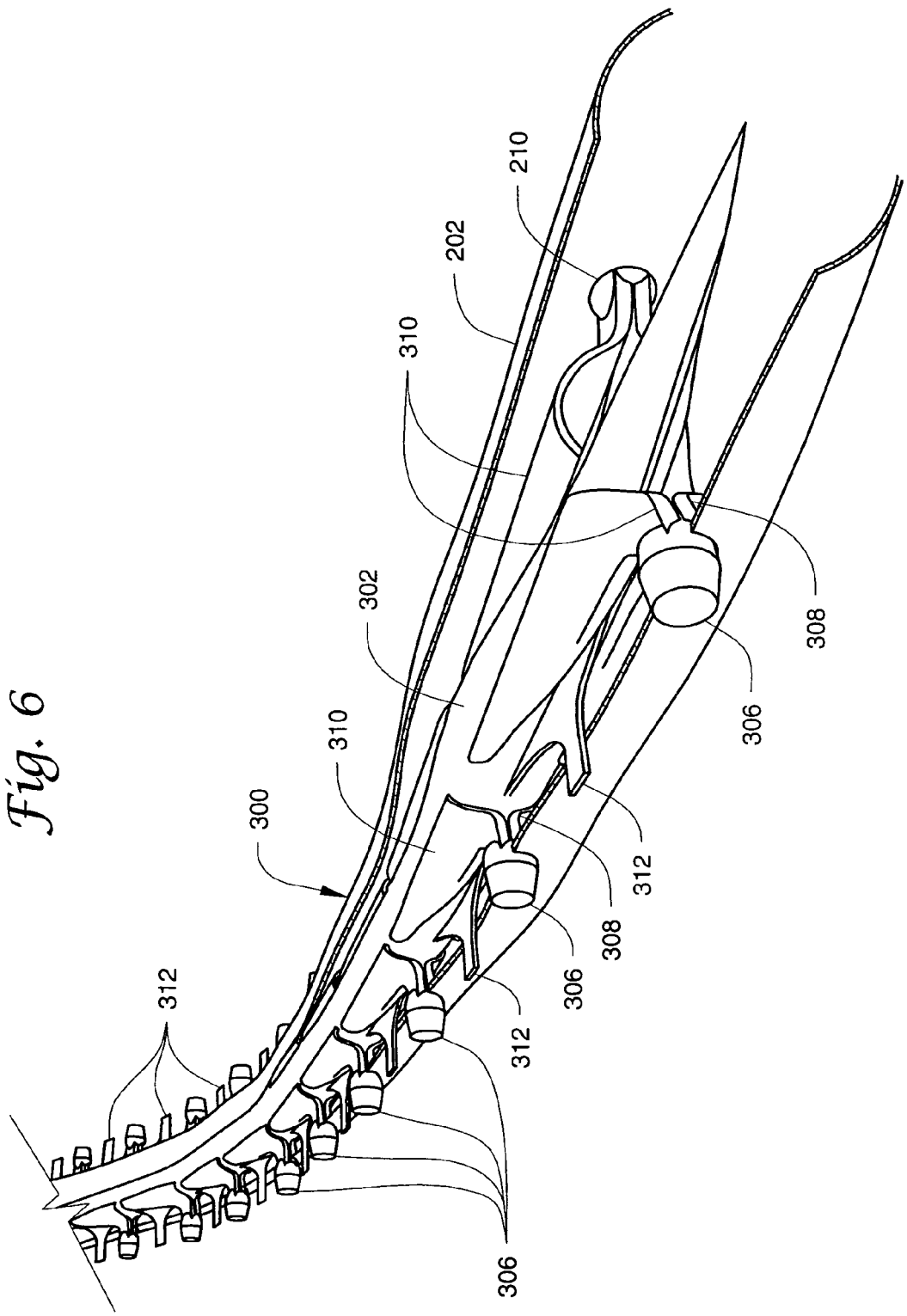
FIG. 6 is a cutaway, perspective view of a portion of the cord structure of FIG. 2 as it may be positioned within the passageway.

FIGS. 3 and 4 illustrate, respectively, a side elevation view and a front elevation view of the cord structure 300, whiles FIGS. 5 and 6 illustrate perspective views of the cord structure (with FIG. 6 being a cut-away view). As clearly shown in these figures, the cord structure 300 may include the cord portion 302 (anatomically corresponding to the spinal cord) and, in some cord structure embodiments, dorsal root elements 308 (see FIGS. 5 and 6) and ventral root elements 310 (corresponding to dorsal and ventral nerve roots); and two lateral fin members 312 (corresponding to dentate ligaments). The root elements 308 and 310 may converge on each side of the cord structure 300 to form the transverse tabs 306. The transverse tabs 306 generally anatomically correspond to nerve root bundles that gather on each side of the spinal cord before exiting the spinal canal. As mentioned above, the tabs 306 may engage openings 210 in the model body 200 (see FIG. 2). This permits anchoring of the cord structure 300 to the walls of the passageway while also simulating the actual structure within the spinal column.

In human anatomy, the nerve roots below vertebral level T10 become longer and extend lower before exiting the spinal canal. The spinal cord typically ends at about level T12 or L1. However, the spinal canal in the lumbar and sacral regions is filled with bundles of nerve roots. To simulate the lumbar and sacral nerve roots, tube elements, e.g., polyurethane tubes 307, may be attached to the cord portion 302 at a first end and allowed to drape or extend along a portion of the length of the cord structure 300 into the simulated sacral space of the passageway 202.

FIG. 2 illustrates assembly of the spinal model apparatus 100 in accordance with one embodiment of the invention. The cord structure 300 may be placed into the channel 202a of half 204a and the tabs 306 located in corresponding openings 210 of the half 204a. In some embodiments, the tabs 306 may deform slightly so that they form a relatively tight, waterproof seal with the openings 210. Once the cord structure 300 is anchored to the half 204a, the dorsal fin member 304 may locate in the receiving slot 208. The opposing half 204b may then be coupled to the half 204a such that the channels 202b and 202a align. The tabs 306 proximate the half 204b may then be engaged with the corresponding openings 210. When the cord structure 300 is fully anchored to each half 204a and 204b and all lumbar and sacral nerve roots have been placed, the two halves may be secured to one another with the fasteners 206 to yield the model apparatus 100.

Figure 7:
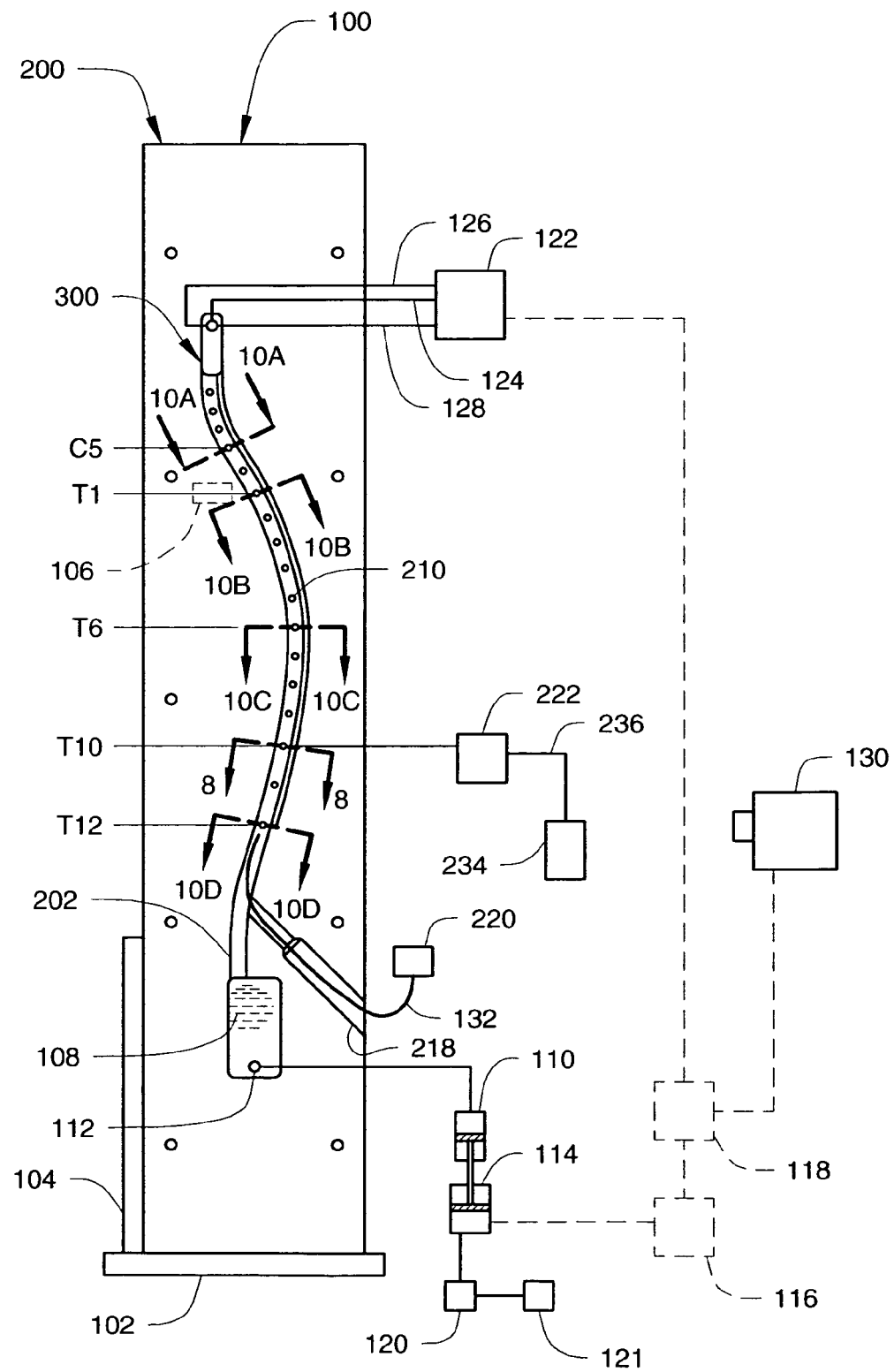
FIG. 7 is a diagrammatic view of an in-vitro spinal model apparatus in accordance with one embodiment of the invention.
Figure 8:
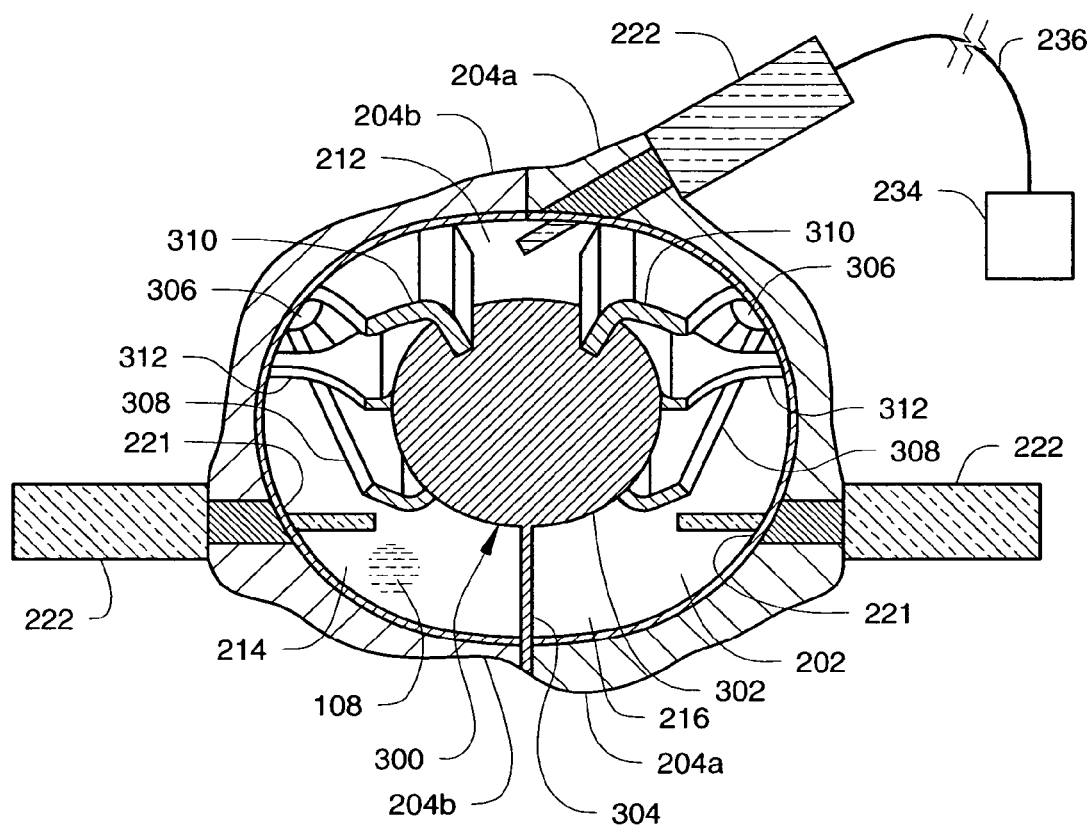
FIG. 8 is a partial cross section of the apparatus of FIG. 7 taken along lines 8-8 of FIG. 7 (view rotated 90 degrees for clarity)

FIG. 7 illustrates the model apparatus 100 as it may be configured for testing in accordance with one embodiment of the invention. For clarity, some features of the apparatus, e.g., some features of the cord structure 300, are not illustrated in FIG. 7. FIG. 8 illustrates a detailed cross sectional view of the passageway 202 and cord structure 300 taken along lines 8-8 (level T10) of FIG. 7.

In FIG. 8, the two halves 204a, 204b are shown assembled with the cord structure 300 captured between within the passageway 202. Connecting elements including the dorsal fin member 304 (septum posticum), dorsal and ventral root elements 308, 310, transverse tabs 306 (nerve bundles), and lateral fin members 312 (dentate ligaments) are clearly identifiable within this cross sectional view. Also evident in this view is the partitioning of the resulting annular region between the cord member 300 and the walls of the passageway 202. In particular, the dorsal fin member 304 and lateral fin members 312 partition the passageway into three longitudinal chambers: an anterior chamber 212; a left posterior chamber 214; and a right posterior chamber 216. At some vertebral locations, the cord portion 302 may come close to, or even contact, a portion of the walls of the passageway 202. Although, in these instances, the annular region may not completely circumscribe the cord portion 302, the term "annular region" is intended to describe the space that exists between any portions of the cord portion 302 and the walls of the passageway 202.

FIG. 7 illustrates the apparatus 100 having other optional components. For example, the apparatus 100 may be configured as a table-top unit and thus include a base 102 and/or a base gusset 104 for support. For quickly identifying vertebral locations, indicia 106 indicating the vertebral level (e.g., C1 ... C5, T1 ... T12, etc.) may be provided, as described above, at the respective locations on one or both sides of the body 200.

The passageway 202, may be filled with a fluid 108 having properties that simulate those of CSF. While CSF is composed primarily of saline, it also includes a variety of other substances, e.g., proteins, in solution. However, these other substances are not believed to have a major effect on fluid mechanics or mixing. Accordingly, in some embodiments, the passageway 202 may be filled with a saline solution to simulate CSF. In one embodiment, the saline solution may include about 0.9% sodium chloride. However, other solutions are certainly possible without departing from the scope of the invention.

Magnetic resonance imaging (MRI) has indicated that spinal CSF oscillates in synchrony with the cardiac cycle. To simulate this oscillating flow, an oscillatory flow apparatus may be provided. The oscillatory flow apparatus may include a hydraulic cylinder 110 filled with saline (or other fluid) and connected to the passageway 202, e.g., at a port 112. The cylinder 110 may be coupled to a small pneumatic cylinder 114 operable to cycle at about 1 Hertz (Hz) to simulate the cardiac cycle. Amplitude may be adjustable so that the velocity of the fluid 108 does not exceed about 3 centimeters/second, a value accepted as typical in human physiology (see, e.g., *On the Pulsatile Nature of Intracranial and Spinal CSF Circulation Demonstrated by MR Imaging*, Greitz et al., *Acta Radilologica* 34 (1993)321; *Fourier Analysis of Cerebrospinal Fluid Flow Velocities: MR Imaging Study*, Thomsen et al., *Radiology* 177 (1990)659; and *Flow Dynamics of Cerebrospinal Fluid: Assessment with Phase-Contrast Velocity MR Imaging Performed with Retrospective Cardiac Gating*, Nitz et al., *Radiology* 183 (1992) 395). Because the model body 200 may have substantially rigid walls, the oscillation amplitude may be generally constant at all vertebral levels.

The pneumatic cylinder 114 may, in one embodiment, be controlled by a servovalve 116 coupled to a closed-loop controller, e.g., a computer 118. In such a configuration, a transducer (not shown) may provide feedback on one or more parameters, e.g., fluid velocity in the passageway 202, and adjust the cylinder 114 accordingly. Alternatively, the cylinder 114 may include a flow control valve 120 calibrated to provide the desired flow rate, and a timer 121 operable to turn the valve 120 on and off at the desired interval.

The apparatus 100 may also include a mechanism to provide a substantially constant flow of CSF through the passageway 202. Some anatomy textbooks report that such a continuous flow of CSF may enter the spinal canal on the dorsal side of the cord from the brain ventricles. The CSF is believed to travel downwardly along the dorsal side of the cord to the sacrum, where it then returns upwardly along the ventral side of the cord to the cisterna magna (for further discussion, see *Spinal Descent of Cerebrospinal Fluid in Man*, Di Chiro et al., *Neurology* 26 (1976) 1-8).

While existence of this continuous flow is not universally accepted, a continuous flow pump assembly, e.g., peristaltic pump 122, may optionally be included with the apparatus 100 as shown in FIG. 7. In one embodiment, the pump 122 draws fluid 108 from the anterior chamber 212 (see FIG. 8) of the passageway 202 via a first connection 124. The flow may then be divided and returned to the left posterior chamber 214 and the right posterior chamber 216 of the passageway 202 via connections 126 and 128, respectively. The pump 122, like the actuator 110, may be disabled to determine the distribution effects of both continuous and oscillatory flow rates.

The apparatus 100 may also optionally include a camera 130 to permit visual observation of drug distribution within the passageway 202. The camera 130 may provide various visualization modes (e.g., still, video, time-lapse) to capture various fluid characteristics by visualizing a marker within an infused substance.

A drug (or other substance) may be infused or otherwise introduced into the passageway 202 via a catheter 132 (only partially shown in FIG. 7). One or both of the halves 204a, 204b may include a port, e.g., catheter port 218, that permits catheter entry into the passageway 202 in an anatomically realistic location. The tip of the catheter 132 may be routed up the passageway 202 to the desired vertebral location, e.g., T10, and the catheter secured in place. The catheter 132 may be coupled to an implantable infusion pump/programmer 220 or, alternatively, may receive the drug via other known methods, e.g., a syringe or a syringe pump (not shown). Other embodiments may utilize spinal catheters such as the model 8703W or model 8731 produced by Medtronic Corp. of Fridley, Minn., USA.

It will be understood that any solution of substance may be introduced into the passageway 202, e.g., via the catheter port 218, in most any manner. For example, a solution including a substance could be introduced by bolus injection, continuous infusion, pulsatile infusion, and the like. It will be further understood that properties of the solution, such as, e.g., baricity, temperature, viscosity, hydrophobicity, etc., may be modified to determine the effect of the modification on distribution of the substance in the passageway 202.

One or more of the camera 130, peristaltic pump 122, actuator 110, and other data collection and control devices (not shown) may optionally be coupled to the computer 118 to provide automation of various test functions.

FIGS. 7 and 8 also diagrammatically illustrate sample taking devices, e.g., test probes 222 (only one probe illustrated in FIG. 7), that may be located at sampling ports 221 (see FIG. 8) proximate at least one vertebral location along the passageway 202. The probes 222 may assist with detecting the presence and concentration of an infused drug within the passageway 202.

While a variety of probes may be used without departing from the scope of the invention, the embodiment of FIGS. 7 and 8 may utilize what are referred to in the art as microdialysis probes. Microdialysis is a technique for monitoring the chemistry of extracellular space in living tissue by functionally simulating a capillary. When a solution is passed through a microdialysis probe, the solution may equilibrate with the surrounding extracellular tissue fluid. The fluid sample gathered by the microdialysis probe will then contain representative proportions of the molecules present in the extracellular tissue's fluid. The contents of the microdialysis probe may then be analyzed using various techniques, e.g., High Performance Liquid Chromatography (HPLC).

Figure 9:
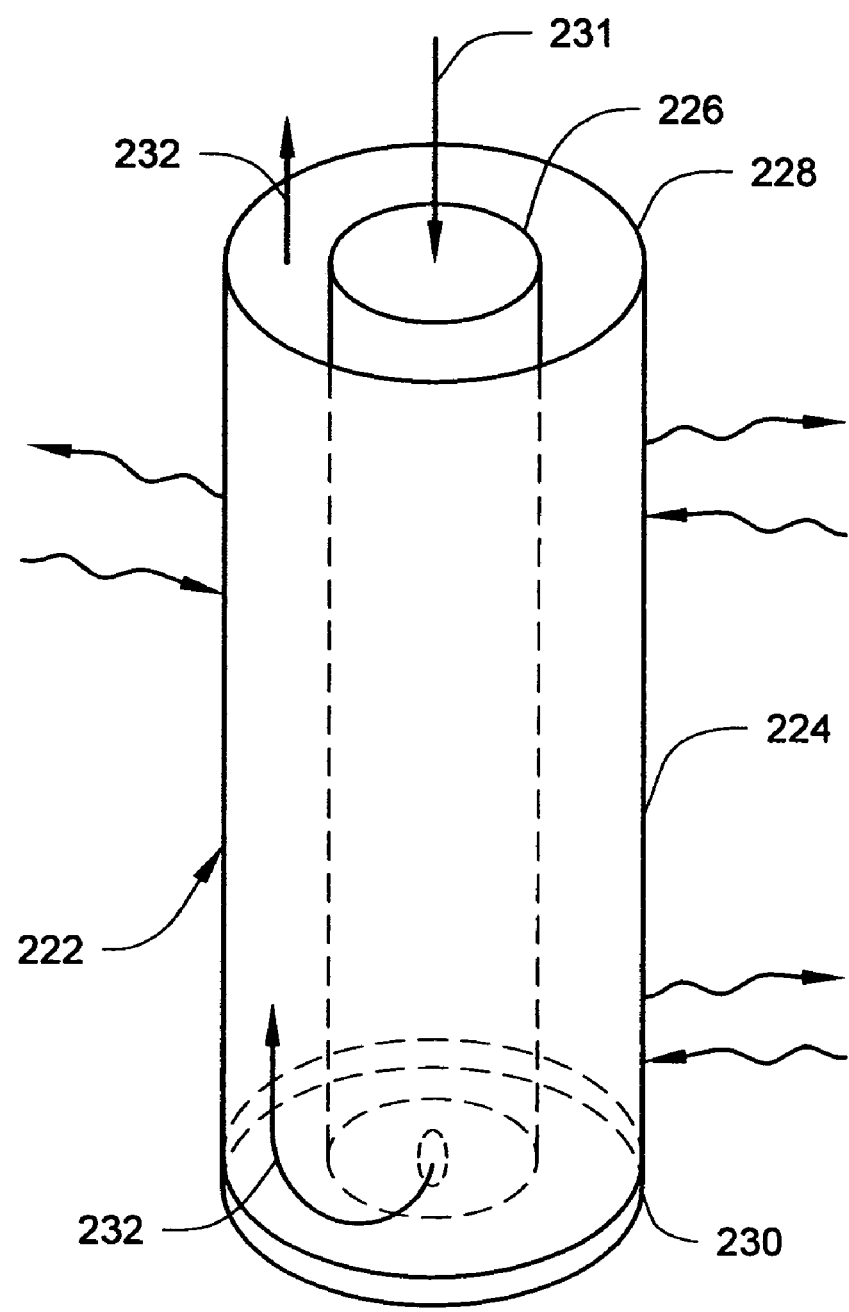
FIG. 9 is a diagrammatic view of a sample taking device, e.g., a microdialysis probe, in accordance with one embodiment of the invention.
Figure 10A:
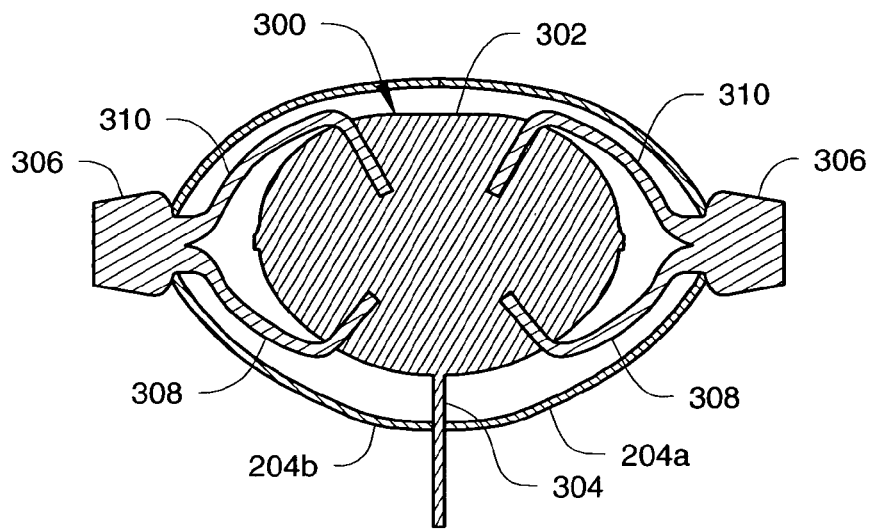
FIGS. 10A-10D are partial cross sections of the apparatus of FIG. 7 taken along lines 10A-10A, 10B-10B, 10C-10C, and 10D-10D, respectively (each view rotated 90 degrees for clarity)
Figure 10B:
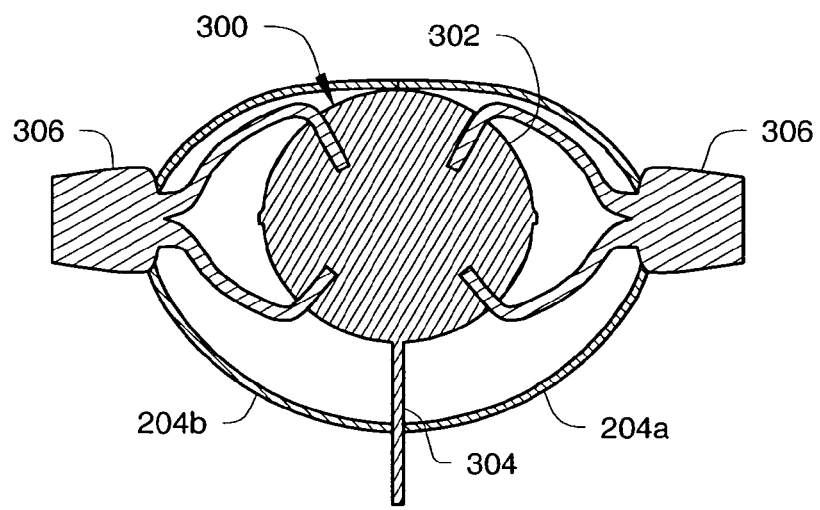
Figure 10C:
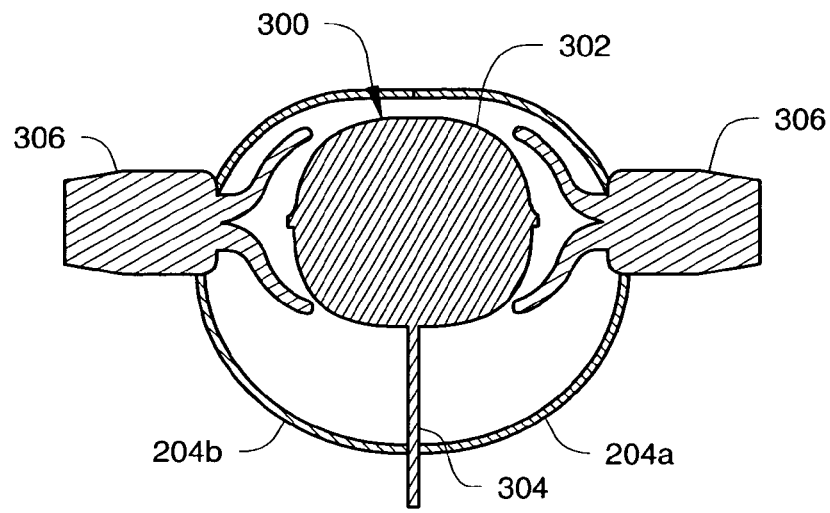
Figure 10D:
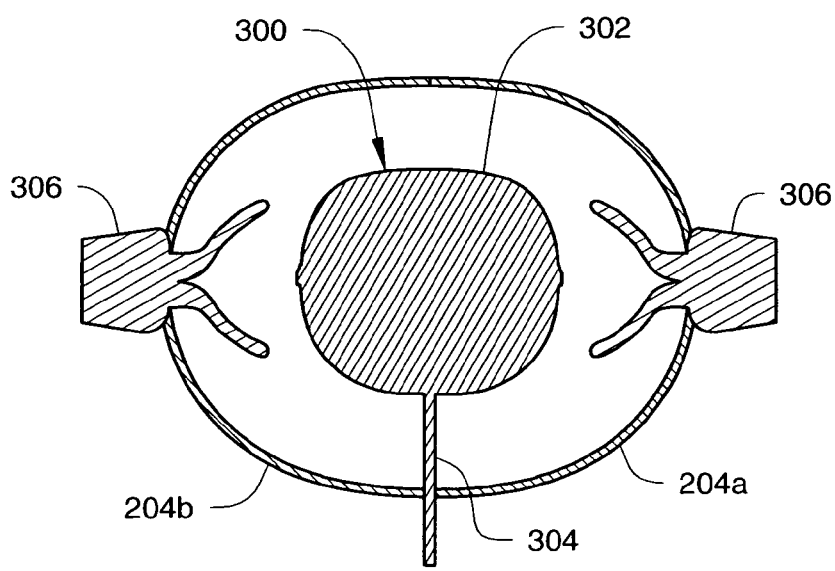

The microdialysis probe 222 utilized in some embodiments of the present invention is diagrammatically illustrated in FIG. 9. In general, the probe is constructed with a tubular outer membrane 224 and a concentric inner tube 226. Fluid may enter the probe 222 at a proximal end 228 of the inner tube 226 and flow towards a distal end 230 as represented by arrows 231. The fluid may exit the inner tube 226 at or near the distal end 230 and enter the annular space between the inner tube 226 and the outer dialysis membrane 224. The direction of fluid flow may then reverse, i.e., the fluid may then move toward the proximal end of the probe 222 (as shown by arrows 232) where dialysis, i.e., molecule separation, occurs. FIGS. 7 and 8 also illustrate a collection vial 234 (only one illustrated) that may be coupled via tubing 236 to each of the probes 222 to collect the microdialysis samples for subsequent analysis.

Although the positioning of the probes 222 may be modified to accommodate a variety of testing configurations, in one embodiment, three probes 222 were coupled to the apparatus 100 at each desired vertebral level. For instance, one vertebral level that was sampled was T10 shown in FIG. 8. At this level, probes 222 may be located to sample fluid from the anterior chamber 212, the left posterior chamber 214, and the right posterior chamber 216. A similar probe configuration may be present at each vertebral level of interest.

FIGS. 10A-10D illustrate other exemplary partial cross sections of the model apparatus 100 as taken along the corresponding lines indicated in FIG. 7 (note that, for simplicity, no probes 222 are illustrated in these views but, nevertheless, may be included at these vertebral levels in the same or different configuration as shown with respect to FIG. 8). The halves 204a, 204b and the cord structure 300 are clearly evident in these views, as are the transverse tabs 306 and dorsal fin member 304. The varying relative dimensions, e.g., cross sectional shape and area, of the cord structure 300 and the passageway 202 are also evident over their respective longitudinal lengths in these views. As these cross-sections indicate, the model apparatus 100 may also simulate the more vertical positioning of the root elements 308 and 310 at the lower vertebral levels.

EXAMPLES

Experiments were carried out using an apparatus substantially identical to the apparatus 100 shown in FIG. 7. While the actual control parameters and test equipment may vary without departing from the scope of the invention, in some embodiments, the apparatus 100 was configured as shown in FIG. 7 and in accordance with the parameters shown in Table I.

After installing the probes 122 at the desired locations, the catheter 132 was inserted into the lumen 218 until the catheter tip was located on the right anterior side at or near vertebral level T10 (see FIG. 7). The passageway 202 was then filled with fluid 108 and the passageway, cylinder 110, and pump 122 were purged of air. The apparatus 100 was then placed into a temperature control apparatus, e.g., a walk-in temperature chamber, and allowed to reach ambient temperature of about 37 degrees C. A solution including Baclofen was then infused at a rate of about 1 milliliter/hour through the catheter 132. Table I provides information pertaining to specific components of the apparatus 100 of FIG. 7 used in these examples.

TABLE I

| Reference No. | Manufacturer | Mfg. P/N | Description |
|---|---|---|---|
| 222 | CMA Microdialysis AB | 8309561 | Probe, CMA/12 14/01 PC |
| 110 | Clippard Instrument | CR-UDR-12-2V | Hydraulic Cylinder |
| 114 | Bimba Mfg. | BIM123 | Air Cylinder |
| 108 | Baxter | NDC 0338-0048-04 | 0.9% Saline Irrigation, USP |
|  | Medtronic, Inc. | 168645-010 | Lioresal Intrathecal Baclofen injection 2 mg/mL |
| 220 | Medtronic, Inc. | 8627-10 | Synchromed EL Infusion Pump (with 8820 programmer) |
| 122 | Manostat | 72-215-000 | Varistaltic Pump Plus |

Figures 11A, 11B, 11C:
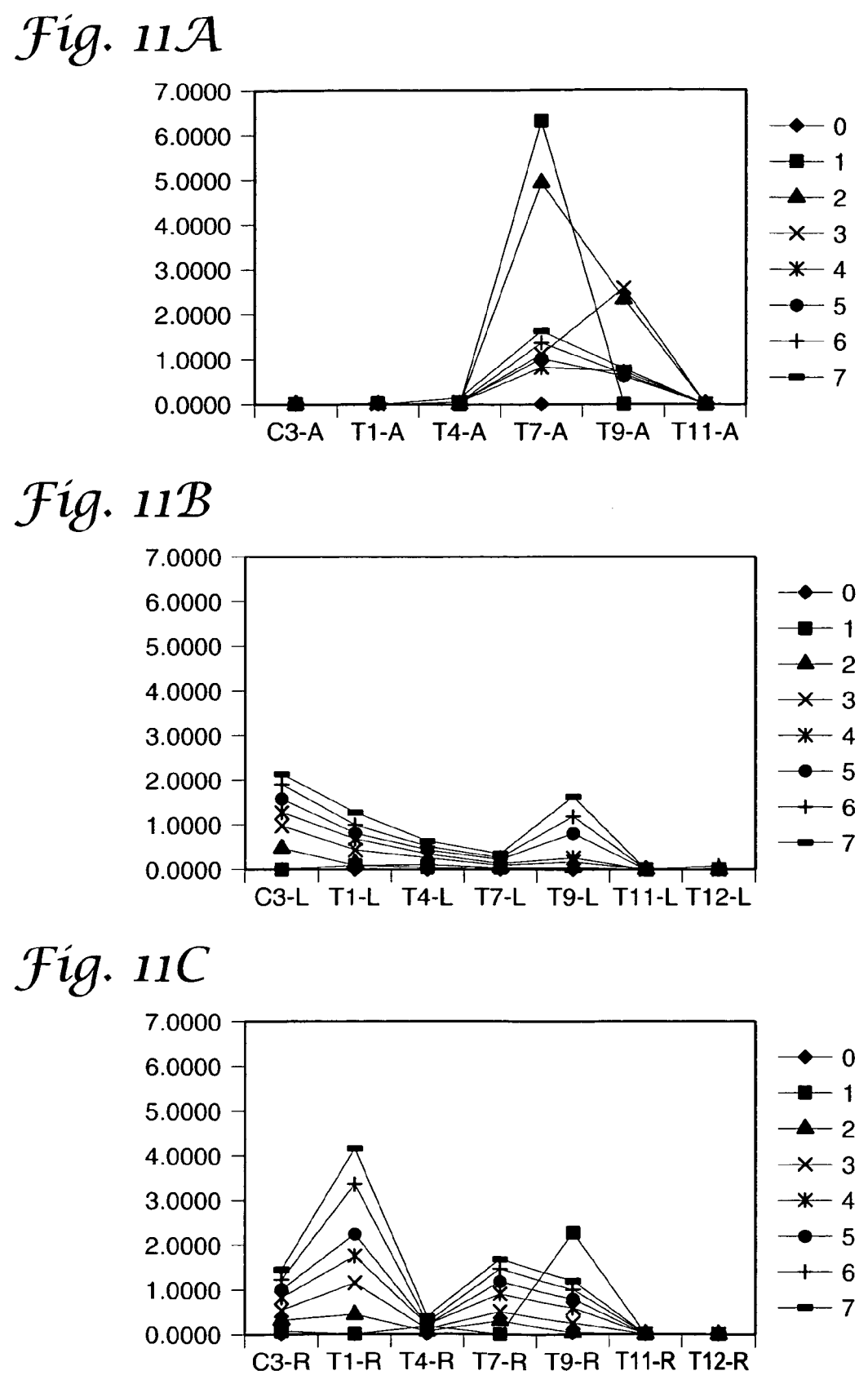
Figure 12A:
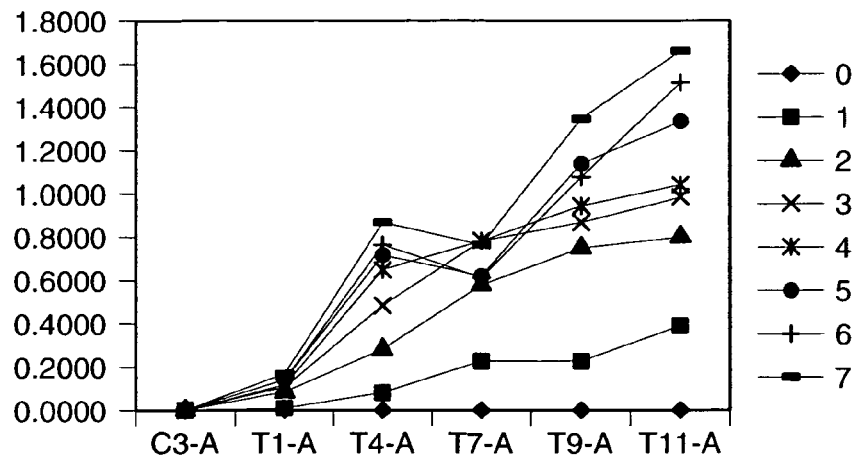
FIGS. 12A-12C illustrate exemplary drug distribution profiles for a second exemplary test configuration using the model apparatus of FIG. 7, the profiles taken at various vertebral locations within the anterior chamber of the spinal model (FIG. 12A), the left posterior chamber of the spinal model (FIG. 12B), and the right posterior chamber of the spinal model (FIG. 12C).
Figure 12B:
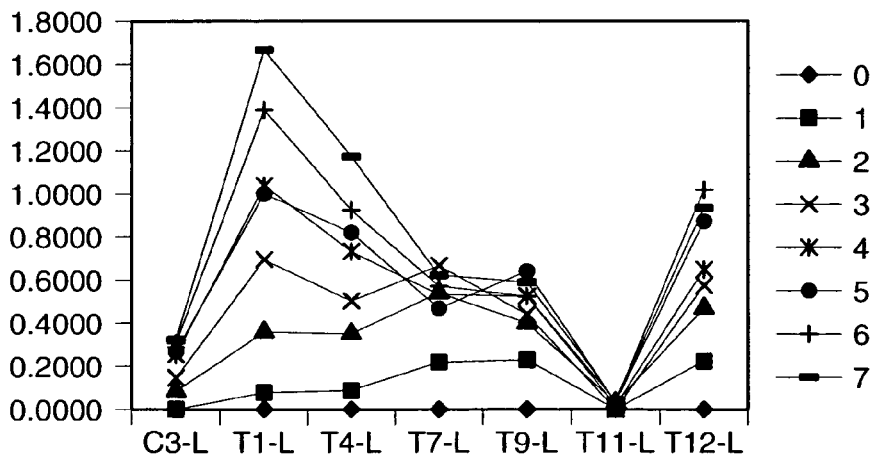
Figure 12C:
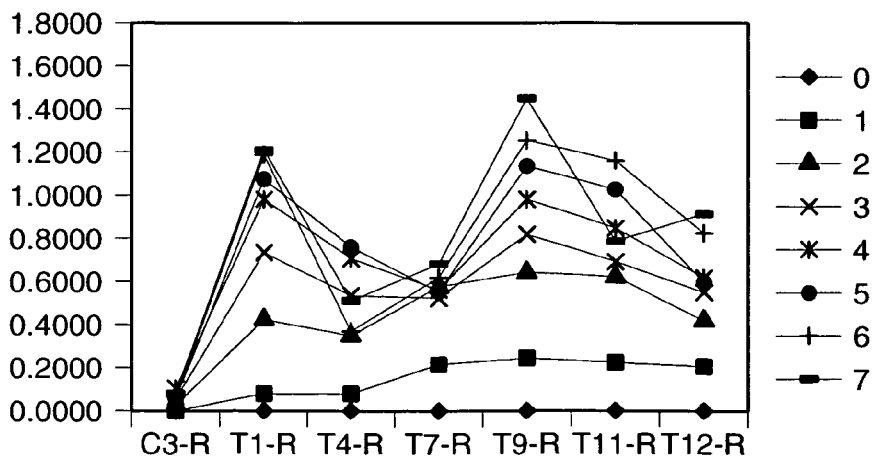

FIGS. 11A-11C illustrate data collected with the pump 122 and cylinder 110 deactivated, e.g., no continuous or oscillatory flow. FIGS. 12A-12C illustrate data collected when the pump 122 was set to deliver a continuous flow of about 12 milliliters/minute and the cylinder 110 was set to deliver an oscillating flow at about 1 Hz and at an amplitude that maintained the velocity of the fluid 108 at about 3 centimeters/second using the manual valve 120 and timer 121.

The X-axis on each graph of FIGS. 11A-11C and 12A-12C represents the vertebral level at which the probes were placed. The Y-axis, on the other hand, shows relative drug concentration levels. The magnitude of the Y-axis units are arbitrary and are derived from subsequent HPLC analysis.

Each line on the graphs of FIGS. 11A-11C and 12A-12C represents a different time point, each time point being about 30 minutes apart. For example, '0' represents the start of infusion, '1' represents 30 minutes after the start of infusion, and '2' represents 60 minutes following the start of infusion, etc. (it is noted that FIGS. 11C and 12B include instances where one probe did not appear to be functioning properly, e.g., yielded zero concentration readings).

In addition to HPLC concentration analysis, visual monitoring, e.g., video capture with the camera 130 (see FIG. 7), of markers, e.g., dyes, that were added to the infused Baclofen was also conducted and analyzed.

Other tests were conducted varying other parameters including: delivery rates (continuous and bolus); catheter construction; and catheter tip locations.

Apparatus and methods of the present invention thus permit both visual and quantitative modeling of substance, e.g., drug, distribution within the human spinal column. The model apparatus may simulate not only the structural features of the human spine, but may also permit the simulation of various CSF flow characteristics present therein.

The complete disclosure of the patents, patent documents, and publications cited in the Background, the Detailed Description of Exemplary Embodiments, and elsewhere herein are incorporated by reference in their entirety as if each were individually incorporated.

Exemplary embodiments of the present invention are described above. Those skilled in the art will recognize that many embodiments are possible within the scope of the invention. Other variations, modifications, and combinations of the various components and methods described herein can certainly be made and still fall within the scope of the invention. For example, other sampling methodologies may be combined with any of the spinal models described herein. Thus, the invention is limited only by the following claims, and equivalents thereto.

What is claimed is:

1. A three-dimensional in-vitro model apparatus of a human spine comprising:
   a model body comprising a column portion, the column portion defining a curved passageway in the shape of a human spinal canal, wherein the column portion comprises two mating halves, each half defining a portion of the passageway; and
   an artificial cord structure to simulate a human spinal cord structure located within the passageway of the column portion, wherein the cord structure is securable within the passageway such that an annular region is formed between a wall of the passageway and the cord structure.

2. The model apparatus of claim 1, further comprising a fluid occupying the annular region.

3. The model apparatus of claim 1, wherein the cord structure varies in cross-sectional area and cross-sectional shape over its longitudinal length.

4. The model apparatus of claim 1, further comprising at least one root element extending between the cord structure and the wall of the passageway.

5. The model apparatus of claim 2, wherein the fluid comprises saline.

6. The model apparatus of claim 2, further comprising a pump assembly operatively coupled to the passageway.

7. The model apparatus of claim 6, wherein the pump assembly is operable to create a substantially continuous flow of the fluid through the annular region.

8. The model apparatus of claim 7, wherein the pump assembly comprises a peristaltic pump.

9. The model apparatus of claim 2, further comprising a sample taking device located at one or more locations along the passageway.

10. The model apparatus of claim 9, wherein the sample taking device comprises a microdialysis probe.

11. The model apparatus of claim 1, wherein the model body comprises a transparent material.

12. The model apparatus of claim 11, wherein the transparent material comprises acrylic plastic.

13. The model apparatus of claim 1, further comprising a catheter port extending from the passageway through the model body.

14. The model apparatus of claim 1, wherein a cross section of the passageway forms an ellipse.

15. The model apparatus of claim 1, further comprising tube elements extending along a portion of the length of the cord structure, each tube element comprising a first end coupled to the cord structure.

16. A method of characterizing a distribution of a substance in a human spinal column, the method comprising:
   introducing a second fluid comprising the substance into a first fluid, the first fluid located within an annular region of a spinal model, the spinal model comprising:
      a model body comprising a column portion, the column portion defining a curved passageway that mimics a shape of a human spinal canal; and
      an artificial cord structure to simulate a human spinal cord, the cord structure located within the passageway of the column portion, wherein the cord structure is securable within the passageway such that the annular region is formed between a wall of the passageway and the cord structure;
   circulating the first fluid within the annular region, wherein circulating the first fluid comprises inducing an oscillating flow of the first fluid; and
   detecting a concentration of the substance within the first fluid at one or more locations along the passageway.

17. The method of claim 16, further comprising visually monitoring the distribution of the substance within the first fluid through a transparent portion of the column portion.

18. The method of claim 16, wherein detecting the concentration of the substance within the first fluid comprises:
   gathering a sample from the annular region with a probe; and
   detecting the concentration of the substance within the sample.

19. The method of claim 18, wherein detecting the concentration of the substance comprises detecting the concentration with high performance liquid chromatography.

20. The method of claim 16, wherein circulating the first fluid comprises inducing a continuous flow of the first fluid.

21. The method of claim 16, wherein introducing the second fluid comprises infusing the second fluid with a catheter.

22. A three-dimensional in-vitro model of a human spine comprising:
   a column portion comprising a substantially enclosed passageway formed therein;
   a cord structure securable within the passageway, wherein an annular region is formed between a wall of the passageway and the cord structure;
   one or more connecting elements spanning across the annular region between the cord structure and the wall of the passageway; and
   one or more longitudinal fin members spanning across the annular region between the cord structure and the wall of the passageway.

23. The model of claim 22, further comprising a catheter port extending through the column portion to the passageway.

24. The model of claim 22, further comprising tube elements extending generally along a portion of the cord structure, each tube element comprising a first end coupled to the cord structure.

25. A three-dimensional in-vitro model of a human spine comprising:
   a column portion comprising a substantially enclosed passageway formed therein, wherein the passageway mimics a shape of a human spinal canal;
   a plurality of sampling ports extending through the column portion to the passageway;
   an artificial cord structure to simulate a human spinal cord, the cord structure securable within the passageway, wherein an annular region is formed between a wall of the passageway and the cord structure;
   a first fluid substantially filling the annular region; and
   an oscillatory device operable to induce an oscillatory flow of the first fluid.

26. The model of claim 25, further comprising a pump assembly, the pump assembly operable to induce a continuous flow of the first fluid.

27. The model of claim 25, wherein the oscillatory device comprises a hydraulic cylinder.

28. The model of claim 27, wherein the oscillatory device further comprises a pneumatic cylinder.

29. The model of claim 25, further comprising a temperature control unit operable to maintain the model at a predetermined temperature.

30. A three-dimensional in-vitro model apparatus of a human spine comprising:
- a model body comprising a column portion, the column portion defining a curved passageway in the shape of a human spinal canal;
- a cord structure located within the passageway of the column portion, wherein the cord structure is securable within the passageway such that an annular region is formed between a wall of the passageway and the cord structure;
- a fluid within the annular region; and
- fin members extending between the cord structure and the wall of the passageway, the fin members operable to partition the annular region into two or more longitudinal chambers.

31. The model apparatus of claim 30, wherein the fin members comprise three fin members operable to partition the annular region into three longitudinal chambers.

32. The model apparatus of claim 30, wherein the fin members substantially restrict exchange of the fluid between a first longitudinal chamber and a second longitudinal chamber.

33. A three-dimensional in-vitro model apparatus of a human spine comprising:
- a model body comprising a column portion, the column portion defining a curved passageway in the shape of a human spinal canal;
- an artificial cord structure to simulate a human spinal cord, the cord structure located within the passageway of the column portion, wherein the cord structure is securable within the passageway such that an annular region is formed between a wall of the passageway and the cord structure;
- a fluid occupying the annular region; and
- an oscillatory flow apparatus operable to create an oscillating flow of the fluid through the annular region.

34. A three-dimensional in-vitro model of a human spine comprising:
- a column portion comprising a substantially enclosed passageway formed therein, wherein the column portion comprises two mating halves, each halve defining a portion of the passageway;
- a cord structure securable within the passageway, wherein an annular region is formed between a wall of the passageway and the cord structure; and
- one or more connecting elements spanning across the annular region between the cord structure and the wall of the passageway.

* * * * *